US010211004B2

(12) United States Patent
Wootton et al.

(10) Patent No.: US 10,211,004 B2
(45) Date of Patent: Feb. 19, 2019

(54) INTELLIGENT ELECTRICAL SWITCH

(71) Applicant: Ivani, LLC, Dardenne Prairie, MO (US)

(72) Inventors: Matthew Wootton, O'Fallon, MO (US); John Wootton, St. Louis, MO (US); Chris Nissman, Tucson, AZ (US); Justin McKinney, Wildwood, MO (US)

(73) Assignee: Ivani, LLC, Dardenne Prairie, MO (US)

( * ) Notice: Subject to any disclaimer, the term of this patent is extended or adjusted under 35 U.S.C. 154(b) by 356 days.

(21) Appl. No.: 14/855,031

(22) Filed: Sep. 15, 2015

(65) Prior Publication Data

US 2016/0126031 A1 May 5, 2016

Related U.S. Application Data

(63) Continuation-in-part of application No. 14/698,690, filed on Apr. 28, 2015.

(Continued)

(51) Int. Cl.
*H01H 9/54* (2006.01)
*H02J 13/00* (2006.01)
*H05B 37/02* (2006.01)

(52) U.S. Cl.
CPC .............. *H01H 9/54* (2013.01); *H02J 13/00* (2013.01); *H05B 37/0272* (2013.01);
(Continued)

(58) Field of Classification Search
CPC ....... H01H 9/54; H02J 13/00; H05B 37/0272; H05B 39/02; Y02B 20/48; Y10T 307/76
(Continued)

(56) References Cited

U.S. PATENT DOCUMENTS 5,065,104 A * 11/1991 Kusko ................. G01R 31/025
324/122
5,563,455 A 10/1996 Cheng
(Continued)

FOREIGN PATENT DOCUMENTS

CN     101184353 A    5/2008
CN     201319687 Y    9/2009
(Continued)

OTHER PUBLICATIONS

International Search Report, International Patent Application No. PCT/US2015/057869, dated Feb. 5, 2016, 10 pages.
(Continued)

*Primary Examiner* — Thienvu Tran
*Assistant Examiner* — Brian K Baxter
(74) *Attorney, Agent, or Firm* — Lewis Rice LLC (57) ABSTRACT

An intelligent electrical switch comprising a conventional mechanical switch connected to a computer system in communication with an external device and receiving instructions therefrom. The switch may be installed in an existing circuit to replace one switch in a multi-way wiring geometry, and includes a sensor detecting current on the neutral line. By determining the circuit state, the switch can determine whether, when instructions are received wirelessly to power the circuit on or off, the mechanical switch element should be toggled.

19 Claims, 3 Drawing Sheets

Related U.S. Application Data (60) Provisional application No. 62/074,902, filed on Nov. 4, 2014.

(52) U.S. Cl.
CPC ...... *H01H 2300/03* (2013.01); *H02J 13/0075* (2013.01); *Y02B 20/48* (2013.01); *Y10T 307/76* (2015.04)

(58) Field of Classification Search
USPC .......................................................... 307/115
See application file for complete search history.

(56) References Cited

U.S. PATENT DOCUMENTS

| | | | |
|---|---|---|---|
| 7,663,325 B2 | 2/2010 | McDonough et al. | |
| 8,269,376 B1* | 9/2012 | Elberbaum | H01H 9/167 307/115 |
| 8,593,264 B2 | 11/2013 | Umezawa et al. | |
| 8,766,556 B2 | 7/2014 | Meyer | |
| 2003/0090917 A1* | 5/2003 | Chan | H02J 1/102 363/67 |
| 2004/0196140 A1 | 10/2004 | Sid | |
| 2006/0089117 A1* | 4/2006 | Suzuki | H04B 7/0805 455/269 |
| 2008/0024074 A1 | 1/2008 | Mosebrook et al. | |
| 2009/0121842 A1* | 5/2009 | Elberbaum | G08C 17/02 340/10.5 |
| 2009/0256483 A1 | 10/2009 | Gehman et al. | |
| 2009/0267632 A1* | 10/2009 | Rowe | H02S 50/10 324/764.01 |
| 2010/0145545 A1 | 6/2010 | Mosebrook et al. | |
| 2010/0301775 A1 | 12/2010 | Bella | |
| 2011/0141647 A1 | 6/2011 | Garcia et al. | |
| 2012/0046003 A1 | 2/2012 | Ying | |
| 2012/0207481 A1 | 8/2012 | Elberbaum | |
| 2013/0102264 A1* | 4/2013 | Nakane | H03M 1/1004 455/130 |
| 2013/0201316 A1* | 8/2013 | Binder | H04L 67/12 348/77 |
| 2013/0320769 A1* | 12/2013 | Sawyers | G06F 1/263 307/80 |
| 2014/0105079 A1* | 4/2014 | Bengtsson | H04B 1/005 370/297 |
| 2014/0169795 A1* | 6/2014 | Clough | G06F 19/3418 398/106 |
| 2014/0211345 A1* | 7/2014 | Thompson | B60L 11/1816 361/42 |
| 2014/0214218 A1* | 7/2014 | Eldridge | G01D 4/002 700/286 |
| 2015/0059086 A1* | 3/2015 | Clough | G08C 17/02 5/83.1 |

FOREIGN PATENT DOCUMENTS

| | | |
|---|---|---|
| CN | 201467534 U | 5/2010 |
| CN | 201639825 U | 11/2010 |
| CN | 201839492 U | 5/2011 |
| CN | 102131327 A | 7/2011 |
| CN | 202475882 U | 10/2012 |
| CN | 202738203 U | 2/2013 |
| CN | 202759621 U | 2/2013 |
| CN | 203243557 U | 10/2013 |
| JP | 2005136532 A | 5/2005 |
| JP | 2006129098 A | 5/2006 |
| JP | 2008305800 A | 12/2008 |
| JP | 2011109784 A | 6/2011 |
| KR | 100887425 B1 | 3/2009 |
| KR | 100912039 B1 | 8/2009 |
| KR | 20090113941 A | 11/2009 |
| KR | 101009613 B1 | 1/2011 |
| KR | 20130012996 A | 2/2013 |
| KR | 20130017298 A | 2/2013 |
| KR | 20140080755 A | 7/2014 |
| KR | 20140120748 A | 10/2014 |
| WO | 20080353322 A1 | 3/2008 |
| WO | 2011062445 A2 | 5/2011 |
| WO | 2012010170 A1 | 1/2012 |
| WO | 2014026226 A1 | 2/2014 |
| WO | 2014109486 A1 | 7/2014 |

OTHER PUBLICATIONS

International Search Report, International Patent Application No. PCT/US2015/058019, dated Feb. 5, 2016, 10 pages.

Supplementary European Search Report, International Patent Application No. EP15857587, dated Sep. 20, 2017 (12 pages).

\* cited by examiner

INTELLIGENT ELECTRICAL SWITCH

CROSS REFERENCE TO RELATED APPLICATIONS

This application is a Continuation-in-Part of U.S. Utility application Ser. No. 14/698,690, filed Apr. 28, 2015, which in turn claims benefit of U.S. Provisional Application No. 62/074,902, filed Nov. 4, 2014. This application also claims benefit of U.S. Provisional Application No. 62/074,902, filed Nov. 4, 2014. The entirety of both of these applications is incorporated herein by reference.

BACKGROUND

1. Field of the Invention

This disclosure is related to the field of electrical wiring, and more particularly to systems, methods, and apparatus pertaining to an intelligent multi-way electric switch.

Electrical systems commonly include manual switching systems comprising a switch element combined into a three-way or four-way wiring geometry to provide users with the ability to operate a circuit from multiple locations. For example, it is desirable, and often required by building code, to have a light switch at each entrance to a room. However, if the switches are wired in serial, every switch must be "on" for the light to work. Likewise, if the switches are wired in parallel, every switch must be "off" for the light to turn off. Instead, multi-way wiring geometries are used to cause each switch to operate as a toggle. The circuit has two states—"on" (powered) and "off" (unpowered)—and operating any one of the switches causes the circuit to change to the opposite state—unpowered circuits receive power and turn on, and powered circuits turn off.

In a typical and simple "on/off" switch operating a single circuit, the power supply coming into the building flows to the device which will ultimately receive electrical power. This device may be a light fixture, a wall receptacle, or any other device (or set of devices). The device or devices consuming power are known as the "load." For electricity to flow, there must be a complete electrical circuit between the electrical power source and the load. This means that the "wire" from the source to the load is actually at least two wires—a powered or "hot" wire that contains electrical current flowing to the load (conventionally known in the art as the "black" wire due to the typical color of the non-conductive sheathing surrounding it), and a "neutral" wire that allows current to flow back to the source (conventionally, the "white" wire), completing the circuit. Thus, a simple on/off switch is essentially a movable section of the circuit that causes the circuit to be complete or broken when a user flips the external switch component. That is, when the switch is in the "on" position, the circuit is complete and the electrical potential causes electrical current to flow to the load, providing it with power (and thus, if the load is a light, causing the light to turn on). When the switch moved to the "off" position, the circuit is broken, electrons stop flowing, and the load receives no substantial current, causing the light to turn off.

A three-way switch operates on the same fundamental principles, except that an additional wire is required so that the function of turning power on/off works, regardless of which of the two switches is operated, and regardless of the state of the other switch. This is essentially done by wiring the two switches together with an additional wire so that any time one of the switches changes state, the circuit also changes state.

Figure 1A:
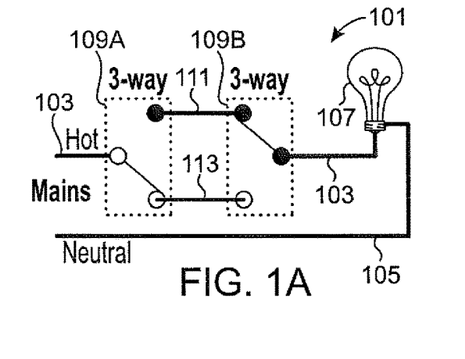
FIGS. 1A-1D depict a prior art three-way power switch.

This can be seen in prior art FIGS. 1A-1D. In FIG. 1A, the circuit (101) includes a hot wire (103) and a neutral wire (105) connected to the load (107) in circuit. In this case the load (107) is a light (107). The hot wire (103) enters a first three-way switch (109A). A section (111) of the hot wire runs from the first switch (109A) to a second three-way switch (109B), and then continues on to the load (107). Also wired between the switches (109A) and (109B) is a switch line (113), conventionally a "red" line due to the typical color of the sheathing. This switch line (113) is what allows the three-way geometry to work.

Figure 1B:
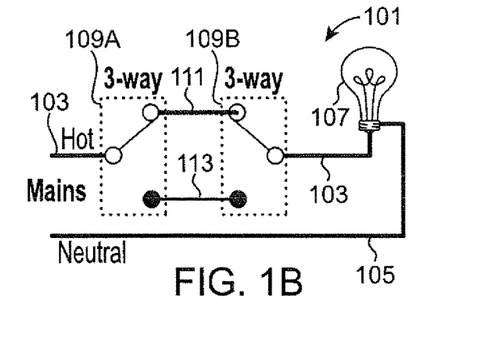
Figure 1C:
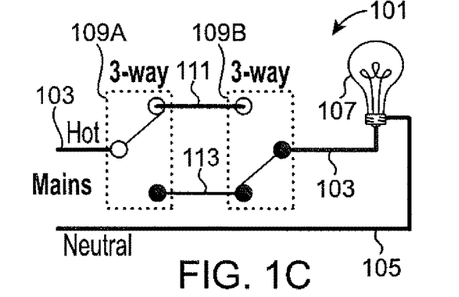
Figure 1D:
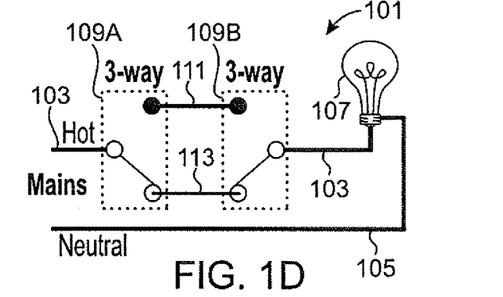

In FIG. 1A, the light (107) is off and circuit (101) is broken, because there is no path for electric current to flow to the load (107). The power flows through the first switch (109A) and across the switch line (113) to the second switch (109B), but the second switch (109B) is connected to the hot line (103) section (111), leaving no continuous path to the load (107). If either switch (109A) and (109B) is toggled, however, power will flow. As can be seen in FIG. 1B, if the first switch (109A) is toggled, a complete circuit results, as electrons can flow from the hot line (103) to switch one (109A), across section (111) to switch two (109B), and into the load (107). Alternatively, as shown in FIG. 1C, if the second switch (109B) is toggled, power can flow from hot line (103) to switch one (109A), across the switch wire (113) to switch two (109B), and then into the load (107). Similarly, either circuit (101) can be broken by operating either switch (109A) and (109B), causing the light (107) to turn off.

This system requires specialized hardware. This is because the hot (103) and neutral (105) wires are generally bundled within an outer sheathe when run through the walls of a building, and then the sheathe is cut and the individual wires are separated and individually attached to the switch, typically by wrapping the end of each wire around a different metal post or pole on the switch, and tightening a screw that holds the wire to the post. The posts are in turn connected to the internal switch components. For this to work, the switch must have enough posts, in the proper configuration, to support three-way switching. This also means that, at a minimum, the section of bundled wire running between the two switches must have a hot (black) line, a neutral (white) line, and a switch (red) line.

Figure 2A:
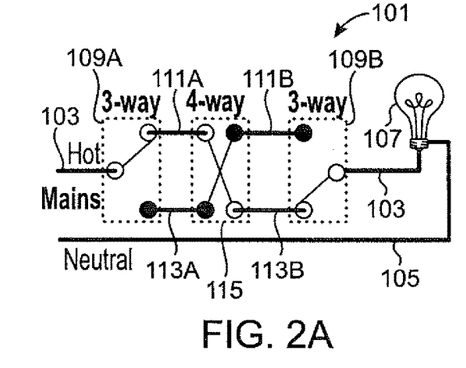
FIGS. 2A-2B depict a prior art four-way power switch.
Figure 2B:
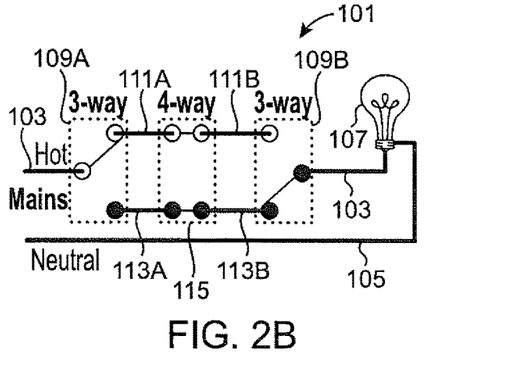

Similar techniques and hardware have been developed for four-way switching. For example, in the depicted prior art embodiment of FIGS. 2A and 2B, four-way switching is implemented using a pair of three-way switches (109A) and (109B) wired to a four-way switch (115). As with three-way switching, the first three-way switch (109A) is connected to the four-way switch (115) using a section (111A) of the hot wire along with a section (113A) of switch wire. Likewise, the four-way switch (115) is connected to a second three-way switch (109B) using a second section of hot wire (111B) and a second section of switch wire (113B). The four-way switch (115) is a double throw/double pull switch, meaning that when the switch is operated, electrical flow through the switch is reversed between the poles. This essentially means that if an electrical path already exists in the system, operating a four-way switch will break the circuit. If electrical flow does not exist, operating a four-way switch will close the circuit. The three-way switches operate as described with respect to prior art FIGS. 1A-1D.

Various attempts have been made to implement a smart multi-way switch via home automation technologies. For example, the load may be a smart device with a single internal switch that communicates wirelessly with remotely placed switches. Thus, when any switch is operated, the device can detect its own state and toggle on/off as needed.

However, these systems do not operate in conjunction with existing wiring and hardware.

For example, home automation systems usually require that fixtures and/or switches be replaced with "smart" devices requiring extensive configuration and set-up. This can add expense, hassle, and waste, as the existing equipment is lost. This can be a problem in buildings with antique or non-standard fixtures, where replacement smart fixtures may not be available. Further, if the conventional wiring is replaced by smart systems, system operation is dependent on continuous communication. If communication is disrupted, the system no longer operates. This makes such systems susceptible to catastrophic failure in the very circumstances where the fixture is likely to be needed. For example, during a storm, a single nearby lightning strike could render the components inoperable. Without a conventional wiring system as a fail-safe, these systems are unsuitable for use in many applications. Thus, users who wish to add automation features to a residence or other building are forced to replace major components of the system and lose the security and/or reliability of conventional switching technologies.

SUMMARY

The following is a summary of the invention in order to provide a basic understanding of some aspects of the invention. This summary is not intended to identify key or critical elements of the invention or to delineate the scope of the invention. The sole purpose of this section is to present some concepts of the invention in a simplified form as a prelude to the more detailed description that is presented later.

Because of these and other problems in the art, described herein, among other things, is an intelligent switching apparatus (301) which actuates a conventional mechanical switch (303) to cause a change in system state. Such a device does not merely mimic the behavior of a conventional system, but actually uses such a system, meaning that if the intelligent switching apparatus were inoperable for any reason, manual use of the switch would continue to function to cause a change in the system state (e.g., power a circuit on or off). Such a system has further advantages in that only one switch is replaced with the intelligent switch to allow the entire multi-way circuit to be toggled remotely. Further, such a smart switch can intelligently track system state knowledge and make decisions accordingly, rather than serving merely as a toggle.

DESCRIPTION OF THE PREFERRED EMBODIMENT(S)

The following detailed description and disclosure illustrates by way of example and not by way of limitation. This description will clearly enable one skilled in the art to make and use the disclosed systems and methods, and describes several embodiments, adaptations, variations, alternatives and uses of the disclosed systems and methods. As various changes could be made in the above constructions without departing from the scope of the disclosures, it is intended that all matter contained in the description or shown in the accompanying drawings shall be interpreted as illustrative and not in a limiting sense.

Throughout this disclosure, the term "computer" describes hardware which generally implements functionality provided by digital computing technology, particularly computing functionality associated with microprocessors. The term "computer" is not intended to be limited to any specific type of computing device, but it is intended to be inclusive of all computational devices including, but not limited to: processing devices, microprocessors, personal computers, desktop computers, laptop computers, workstations, terminals, servers, clients, portable computers, handheld computers, smart phones, tablet computers, mobile devices, server farms, hardware appliances, minicomputers, mainframe computers, video game consoles, handheld video game products, and wearable computing devices including but not limited to eyewear, wristwear, pendants, and clip-on devices.

As used herein, a "computer" is necessarily an abstraction of the functionality provided by a single computer device outfitted with the hardware and accessories typical of computers in a particular role. By way of example and not limitation, the term "computer" in reference to a laptop computer would be understood by one of ordinary skill in the art to include the functionality provided by pointer-based input devices, such as a mouse or track pad, whereas the term "computer" used in reference to an enterprise-class server would be understood by one of ordinary skill in the art to include the functionality provided by redundant systems, such as RAID drives and dual power supplies.

It is also well known to those of ordinary skill in the art that the functionality of a single computer may be distributed across a number of individual machines. This distribution may be functional, as where specific machines perform specific tasks; or, balanced, as where each machine is capable of performing most or all functions of any other machine and is assigned tasks based on its available resources at a point in time. Thus, the term "computer" as used herein, can refer to a single, standalone, self-contained device or to a plurality of machines working together or independently, including without limitation: a network server farm, "cloud" computing system, software-as-a-service, or other distributed or collaborative computer networks.

Those of ordinary skill in the art also appreciate that some devices which are not conventionally thought of as "computers" nevertheless exhibit the characteristics of a "computer" in certain contexts. Where such a device is performing the functions of a "computer" as described herein, the term "computer" includes such devices to that extent. Devices of this type include but are not limited to: network hardware, print servers, file servers, NAS and SAN, load balancers, and any other hardware capable of interacting with the systems and methods described herein in the matter of a conventional "computer."

Throughout this disclosure, the term "software" refers to code objects, program logic, command structures, data structures and definitions, source code, executable and/or binary files, machine code, object code, compiled libraries, implementations, algorithms, libraries, or any instruction or set of instructions capable of being executed by a computer processor, or capable of being converted into a form capable of being executed by a computer processor, including without limitation virtual processors, or by the use of run-time environments, virtual machines, and/or interpreters. Those of ordinary skill in the art recognize that software can be wired or embedded into hardware, including without limitation onto a microchip, and still be considered "software" within the meaning of this disclosure. For purposes of this disclosure, software includes without limitation: instructions stored or storable in RAM, ROM, flash memory BIOS, CMOS, mother and daughter board circuitry, hardware controllers, USB controllers or hosts, peripheral devices and controllers, video cards, audio controllers, network cards, Bluetooth® and other wireless communication devices, virtual memory, storage devices and associated controllers, firmware, and device drivers. The systems and methods described here are contemplated to use computers and computer software typically stored in a computer- or machine-readable storage medium or memory.

Throughout this disclosure, terms used herein to describe or reference media holding software, including without limitation terms such as "media," "storage media," and "memory," may include or exclude transitory media such as signals and carrier waves.

Throughout this disclosure, the terms "web," "web site," "web server," "web client," and "web browser" refer generally to computers programmed to communicate over a network using the HyperText Transfer Protocol ("HTTP"), and/or similar and/or related protocols including but not limited to HTTP Secure ("HTTPS") and Secure Hypertext Transfer Protocol ("SHTP"). A "web server" is a computer receiving and responding to HTTP requests, and a "web client" is a computer having a user agent sending and receiving responses to HTTP requests. The user agent is generally web browser software.

Throughout this disclosure, the term "network" generally refers to a voice, data, or other telecommunications network over which computers communicate with each other. The term "server" generally refers to a computer providing a service over a network, and a "client" generally refers to a computer accessing or using a service provided by a server over a network. Those having ordinary skill in the art will appreciate that the terms "server" and "client" may refer to hardware, software, and/or a combination of hardware and software, depending on context. Those having ordinary skill in the art will further appreciate that the terms "server" and "client" may refer to endpoints of a network communication or network connection, including but not necessarily limited to a network socket connection. Those having ordinary skill in the art will further appreciate that a "server" may comprise a plurality of software and/or hardware servers delivering a service or set of services. Those having ordinary skill in the art will further appreciate that the term "host" may, in noun form, refer to an endpoint of a network communication or network (e.g., "a remote host"), or may, in verb form, refer to a server providing a service over a network ("hosts a website"), or an access point for a service over a network.

Throughout this disclosure, the term "real time" refers to software operating within operational deadlines for a given event to commence or complete, or for a given module, software, or system to respond, and generally invokes that the response or performance time is, in ordinary user perception and considered the technological context, effectively generally cotemporaneous with a reference event. Those of ordinary skill in the art understand that "real time" does not literally mean the system processes input and/or responds instantaneously, but rather that the system processes and/or responds rapidly enough that the processing or response time is within the general human perception of the passage of real time in the operational context of the program. Those of ordinary skill in the art understand that, where the operational context is a graphical user interface, "real time" normally implies a response time of no more than one second of actual time, with milliseconds or microseconds being preferable. However, those of ordinary skill in the art also understand that, under other operational contexts, a system operating in "real time" may exhibit delays longer than one second, particularly where network operations are involved.

Throughout this disclosure, the term "embedded system," "embedded computer," and variants thereof distinguish special purpose computer hardware and software from general-purpose computer hardware and software. As used herein, an embedded system is a special-purpose system in which the computer is mostly or completely encapsulated by the device it controls. Unlike a general-purpose computer, such as a personal computer, an embedded system generally performs more limited, pre-defined tasks, usually with very specific requirements to accomplish a limited and pre-defined set of operational tasks. Since the system is dedicated to a specific task, it is more easily optimized for the task, reducing size and cost by eliminating unnecessary components found in general-purpose computers, and designing board circuitry and system geometry to improve operational efficiency, reduce manufacturing cost, and address operation-specific conditions, such as temperature extremes.

Figure 3:
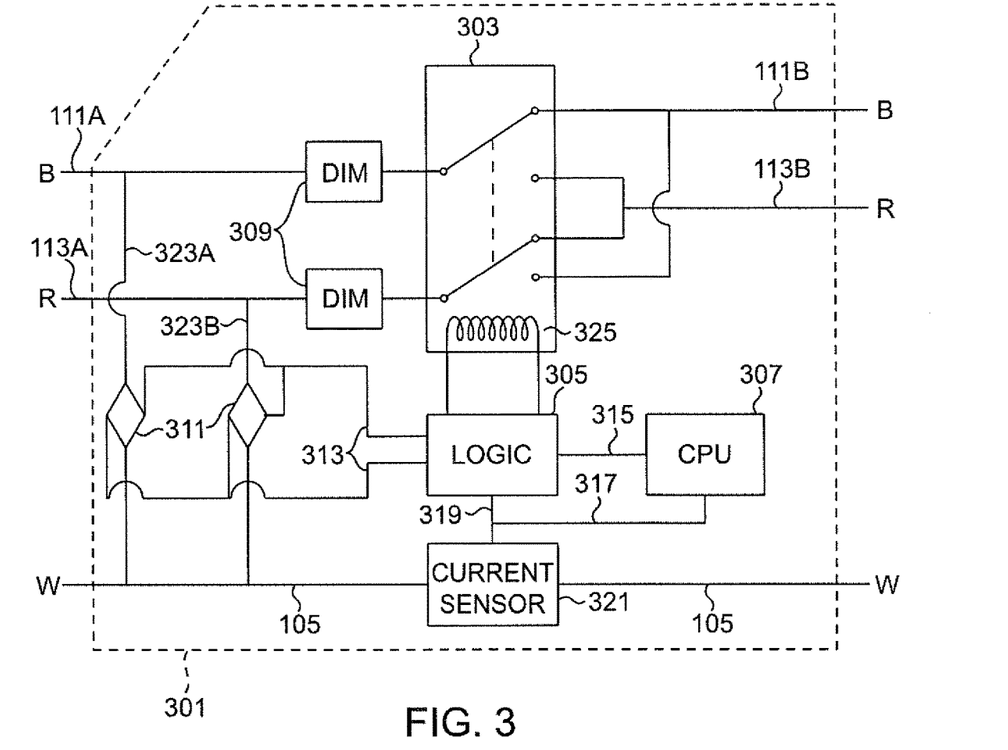
FIG. 3 depicts a schematic diagram of an intelligent switch system according to the present disclosure.

In the depicted embodiment of FIG. 3, an intelligent switch system (301) or device (301) according to the present disclosure is depicted. The depicted device (301) is installed in a four-way switch circuit. The device (301) replaces the four-way switch (115) component of the prior art system, such as that depicted in FIG. 2. The depicted device (302) comprises a conventional four-way switch (303), along with other components not found in a conventional switch, including a logic unit (305), a computer system (307), a current sensor (321) and, optionally, a dimmer circuit (309). Additional circuitry, also depicted in FIG. 3, is included to connect these components as described herein.

In the depicted embodiment, incoming hot lines (111A) and (113A) supply power to the device (301) and are connected to a first three-way switch (109A) situated between the power source and the device (301). Outlet hot lines (111B) and (113B) transmit current from the depicted device (301) to a second three-way switch (109B) situated between the depicted device (301) and the load (107). It is important to understand that the depicted device (301) need not have any knowledge of the state of the other three-way switches (109A) and (109B) in the circuit. The depicted device (301) detects whether the load (107) is receiving power by detecting current on the neutral wire (105). In the depicted embodiment, this is done using a current sensor (321).

In the depicted device (301), switching is provided by a conventional four-way double pole/double throw switch (303) operatively connected to a logic unit (305) and a computer system (307). The logic unit (305) generally issues instructions to the switch (303) to change its state. The computer system (307) is generally an embedded system (307) comprising a wireless telecommunication systems, such as a WiFi®, BlueTooth®, cellular, or other transmitter/receiver system, as well as a processor and storage medium. This system (307) is a controller, and also includes components, circuitry, and programming to receive, send, and process messages and instructions, and to communicate with other components of the device (301). The computer (307) may transmit information, such as system status, to remote devices (403). In an embodiment, logic unit (305) and CPU (307) may be combined into a single unit.

In the depicted embodiment, the logic unit (305) and computer system (307) are preferably supplied continuous power. However, due to the nature of four-way switch geometry, at any given moment in time, power may be on either the black wire (111A) or the red wire (113A). Further, the power on these wires (11 IA) and (113A) is typically alternating current ("AC"), whereas, logic unit (305) and computer system (307) typically require direct current ("DC"). The device (301) may further include appropriate hardware and circuitry for converting AC to DC (not depicted). The device (301) further comprises wiring or circuitry for transmitting the converted DC to the logic unit (305) from either/both the black (111A) and/or red (113A) wires, ensuring that, regardless of which wire (111A) and (113A) has power, the logic unit (305) is powered. Power may also be transmitted to the computer system (307) in similar fashion. To complete the circuit, neutral lines carry power from the logic unit (305) and computer system (307) back to the neutral main (105). Although in the depicted embodiment of FIG. 3, the logic unit (305) and computer system (307) are wired in serial, alternative wiring geometries are possible, such as but not necessarily limited to, parallel.

To prevent backflow of current, one or more diodes (331) may be included in the wiring geometry and/or circuitry. In the depicted embodiment, two diodes (331) are positioned in the circuit between the AC/DC converter (not depicted) and the logic unit (305) and/or computer system (307), one each for the black (111A) and red (113A) power lines. This prevents backflow when the incoming power switches from black to red or red to black. In such an embodiment, neutral wires from the logic unit (305) or computer (307) may be directed back into the diodes (311) and from there to the neutral main (105).

The depicted geometry of FIG. 3 ensures that, regardless of the switch state of the overall circuit, a complete circuit power circuit is provided for at least the logic unit (305) and computer system (317), allowing those components to operate regardless of the switch (303) state, and regardless of which incoming hot wire (111A) and (113A) has power. In the depicted embodiment, the logic unit (305) and computer system (307) are operatively coupled to a current sensor (321), allowing for the detection of power from the load (107). If no current is detected from the load (107), the system can detect that power is off in the overall circuit, whereas if there is power on the neutral wire (105), the system detects that the load (107) is receiving power. Another function of wiring the logic unit (305) or the computer (307) to the current sensor (321) is that the current sensor (321) may detect whether power is coming from the logic unit (305) and/or computer (307). If not, this is generally considered an error state.

The device (301) operates by determining and storing the state of the load (107) (on or off), storing the state of the load, and accessing the stored state. When receiving a command indicating a state the circuit should be changed to (on or off), then the system operates the switch (303) only if the desired or final state differs from the current state. This is done by detecting current on the neutral wire (105), which should generally have high current only if the load (107) is powered. A break in the circuit at any point—whether at the first three-way switch (109A), the second three-way switch (109B), or the device (301) switch (303)—will cause the load (107) to be unpowered, and thus there will be little or no current on the neutral wire (105). The system (301) thus has access to state information through the load status (107), regardless of the status of the other switch components (109A) and (109B) in the overall circuit. Since toggling any switch (109A), (109B), or (303) in the system will cause a change in the load (107) state, switch (303) may be operated to change the load state regardless of the status of the other switches (109A) and (109B). Thus, only one switch in the overall circuit need be replaced with the intelligent device (301) of the present disclosure.

This may be clarified through use of an illustrative, non-limiting example. Beginning with a prior art four-way switch geometry, such as that depicted in FIG. 2, a user replaces in this illustrative example the four-way switch (115) with the intelligent device (301) depicted in FIG. 3. The depicted device (301) of FIG. 3 may be implemented as a generally self-contained unit (301), similar to conventional switches, or may have external components. Installation of the device (301) generally comprises attaching the incoming (111A) and (113A) and outgoing (111B) and (113B) lines to the appropriate end of the switch system, along with the neutral wire (105). One difference between the depicted embodiment and a conventional four-way switch is that with a conventional four-way switch, it typically does not matter which end is which; that is, the incoming/outgoing lines may be attached to either set of posts on the switch and the system will function. However, directionality could be relevant to installation geometry in the depicted embodiment if dimmers (309) are present.

The circuit is typically powered down during installation. After the installation is finished and the circuit is powered on, power will flow in from either the black (111A) or red (113A) main, depending on the state of the first three-way switch (109A). There may or may not be current on the neutral line (105) again depending on the overall system state. If current is detected on the neutral line (105), such as by the current sensor (321), this information is transmitted to the logic unit (305) and/or computer system (307), which can then save in memory that the current system state is "on." Alternatively, if no current is detected, the current state of "off" is stored. In either case, without knowing the status of the other two switches (109A) and (109B), the computer system (307) can determine the overall system state.

Thus, if the computer (307) receives instructions to toggle the system, the computer (307) can cause logic unit (305) to throw the switch (303), thus toggling the system state. If the system was previously on (i.e., power to the load), it will turn off, and vice versa. This will occur regardless of the status of the other switches (109A) and (109B) because in a four-way wiring geometry, any one of the switches (109A), (109B) or (303) can toggle system state, including the four-way switch (303).

More advanced operations and intelligence are possible as well. For example, the instructions received by the computer system (307) may be to turn the system on, meaning that the computer system (307) only toggles the switch (303) if the system is not already on. Thus, the computer system (307) comprises program logic to examine (or detect) the current system state (on or off) and cause logic unit (305) to throw switch (303) only if the system is currently off. If the system is currently on, then no action need be taken because the system is already in the desired final state indicted by the request. Similar logic may be used to turn the system off.

Figure 4:
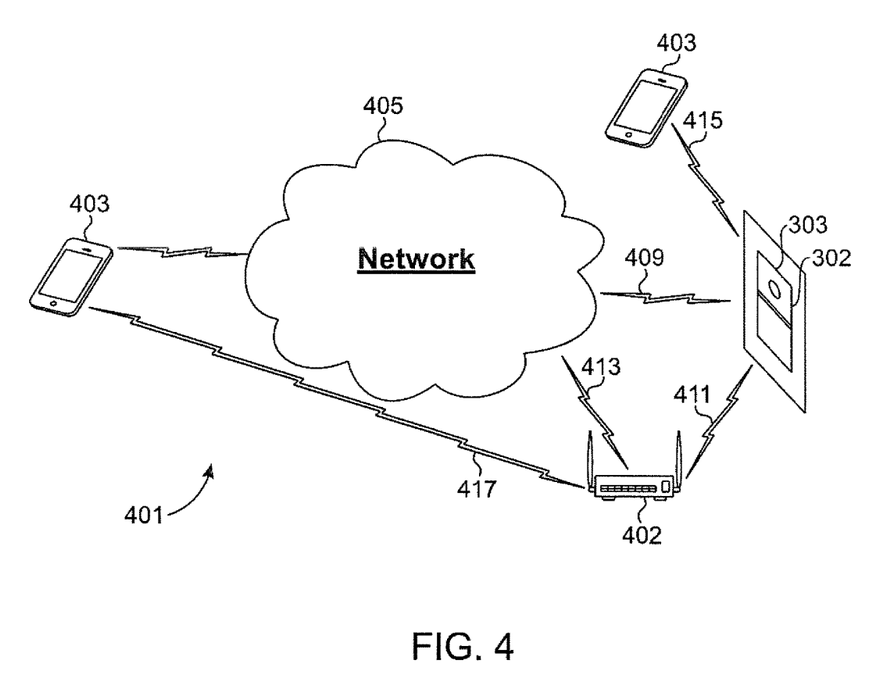
FIG. 4 depicts a schematic diagram of a networking implementation according to the present disclosure.

This feature may be combined with other features to create complex system logic. For example, the computer system (307) may have an internal chronometer, or may access an external chronometer through a network (405) connection, such as by using the universal time protocol to access a public time server. With access to date and time information, the computer (307) may comprise programming to carry out specific operations at specific dates and times. For example, the computer (307) may be instructed to turn on or turn off at a particular time each day. Because the current state is known and/or can be determined, the above program logic may be used to the throw switch (303) or not, depending on whether a change of state is needed to achieve the desired state.

Again, it is important to understand that, due to the structure of the intelligent switch device (301), these features can be implemented in a multi-way switch by replacing only one of the mechanical switch components. The other mechanical switches will continue to operate as desired and expected by users.

In an embodiment, the device (301) can detect error conditions. By way of example and not limitation, if a state change is required to respond to a command, and the switch (303) is thrown, this should cause a change in state on the neutral wire (107). If no such change is detected, an error has occurred. This error may be transmitted or otherwise indicated, such as through use of an LED or other light embedded in the device (301) or by transmitting an error message.

In an embodiment, a dimming circuit (309) may be included. This element (309) is generally situated between the switch (303) and the power circuit for the logic unit (305) and computer system (307), so that changes in power output caused by the dimmer do not impact performance of the logic unit (305) and computer system (307).

The depicted system (301) may be used in any position in a multi-way circuit. One of ordinary skill in the art will understand that this may be done by simply not connecting one of the poles of the four-way switch (303) component for the red line (113A) or (113B). Additionally, the depicted system (301) may be used as the only switching element in the network, allowing it to be utilized without hardware changes in any place a previous mechanical switch existed.

An aspect of the present disclosure is that the intelligent switching system (301) receives commands or instructions from an external source. Although this can be done through a wired configuration, in the preferred embodiment, signals are received wirelessly. FIG. 4 depicts an embodiment of a wireless system. In the depicted embodiment of FIG. 4, the intelligent switch system (301) is installed in an electrical system (not depicted) and is in wireless communication with a user device (403) over a telecommunications network (405). The depicted telecommunications network (405) is a wide-area network, such as the Internet. Alternatively, the system (301) may communicate with a user device (403) directly (415), such as by using a short-range protocol like BlueTooth® or near-field communication. Alternatively, the system (301) may communicate with a user device (403) locally (417) such as by sending and receiving communications (417) and (411) through a local access point or router (407). The particular communications channels used depend in part on where the device is located, and how it is capable of communicating. A device outside the transmission range of short-range transmitters may use a wide-area telecommunications network (405) instead.

The user device (403) is depicted as a mobile phone or smart phone and will generally comprise a computer system. A computer-based user device (403) will generally comprise programming instructions for connecting to and synchronizing with the system (301), wirelessly exchanging data with the system (301), and providing a user interface for accepting user instructions and translating them into commands sent to the system (301), and for displaying status information about the system based on status data received from the system (301). In an alternative embodiment, the user device (403) may be a special-purpose or limited-purpose device configured to interact with the system (301), such as a remote control.

A further aspect of the present disclosure is that certain safety considerations may render it desirable to replace a specific or particular switch in the original circuit. For example, the device (301) could place a circuit into safety mode if it is in the final position before the load (107) (i.e., the last switching device before power is transmitted to the load), such as the second three-way switch (109B). In an embodiment, the device (301) includes programming logic to determine whether the device (301) is in the last position such that the safety feature will function.

This may done by examining the state of other elements of the circuit and calculating a probability. For example, the computer (307) may comprise programming for a confidence-building learning algorithm which develops probabilities based on data gathered during normal operations. Alternatively, or additionally, the computer (307) may comprise programming for determining where the device is in the system in response to a set of switch clicks. In a still further embodiment, the device (301) may sense the presence of voltage and/or current to determine if it is in the last position, such as comparing power on the red and black lines to the voltage sensor state. While certain combinations of reading are non-deterministic, position can generally be inferred from such readings.

For example, if the voltage input to the device (301) changes generally at the same time as the current state on the neutral line, and the device (301) switch state has not changed, it may be inferred that another switch earlier in the circuit has been toggled. This in turn means that it may be inferred that the device (301) is in either the middle or last position, and thus there is a 50/50 chance the device is last. However, if the voltage input line does not change and there is a change in the current flow through the neutral line to a low state (301), it cannot necessarily be inferred that a later switch caused the change, as the load may been removed, damaged, or otherwise broken the circuit (e.g., a light bulb burned out). If the system continues to detect that current changes on the neutral coincide with voltage input changes, and there are never current changes on the neutral without a corresponding voltage input location change excluding those changes caused by actuations of the device (301) itself, each such instance may be inferred to make it more and more likely that the device is in the final position.

Alternatively, the user may cooperate with the system through guided instructions to operate each switch in the circuit in a systematic fashion, ensuring that every state of the system is tested and allowing the program logic to confirm that the system is (or is not) last in the circuit. Other forms of testing or providing such information could also be used, such as the user simply providing an indication to the computer (307), directly or indirectly, of the state/position.

If a dimming circuit is included, the device (301) may further enter safety mode, regardless of switch location, by simply reducing the dimmed power level to zero (or effectively zero) on both lines. This effectively removes power from the circuit, allowing the system to conclude no power is present at the fixtures or loads.

While the invention has been disclosed in conjunction with a description of certain embodiments, including those that are currently believed to be preferred embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of the invention.

The invention claimed is:

1. An intelligent electrical switching device comprising:
   a first neutral terminal and an opposing second neutral terminal;
   a mechanical switch, said mechanical switch being in an operational state;
   a logic unit operatively coupled to said mechanical switch such that said logic unit is operable to cause said mechanical switch to change said operational state;
   a current sensor;
   an electrical path from said first neutral terminal to said second neutral terminal through said current sensor;
   a computer system coupled to said logic unit and comprising a wireless transmitter/receiver operable to send and receive data over a telecommunications network, said computer system comprising a non-transitory machine-readable storage medium having stored thereon computer program instructions for causing the intelligent electrical switching device to perform the steps of:
      wirelessly receiving instructions to set a power state of a circuit in which said intelligent electrical switching device is installed to a desired power state, said desired power state being indicated in said received instructions;
      detecting whether said circuit is in said desired powered state by said current sensor detecting whether a neutral wire of said circuit connected to said current sensor via said electrical path has electrical current;
      only if said circuit is detected as not being in said desired powered state, said logic unit operating said mechanical switch to change said operational state.

2. The device of claim 1, wherein said mechanical switch is a double pole/double throw switch.

3. The device of claim 1, wherein said mechanical switch is capable of being in exactly one operational state.

4. The device of claim 1, wherein said computer system is an embedded system.

5. The device of claim 1, wherein said operational state is selected from the group consisting of: open and closed.

6. The device of claim 5, wherein said program step of said logic unit operating said mechanical switch to change said operational state comprises toggling said operational state.

7. The device of claim 1, said device further comprising:
   a first power input line;
   a power converter disposed on said first power input line, said power converter converting alternating current to direct current;
   a direct current line transmitting current from said power converter to said logic unit when said device receives power on said first power input line.

8. The device of claim 7, said device further comprising:
   a second power input line;
   a second power converter disposed on said second power input line, said second power converter converting alternating current to direct current;
   a second direct current line transmitting current from said second power converter to said logic unit when said device receives power on said second power input line.

9. The device of claim 8, device further comprising:
   a voltage sensor disposed on said second power input line and sensing the amount of voltage on said second power input line;
   said computer system further comprising computer program instructions for causing the intelligent electrical switching device to perform the steps of:
      determining a probability that said device is installed in a switching position immediately prior to a load in said circuit based at least in part on voltage readings received from said voltage sensor.

10. The device of claim 1, wherein said mechanical switch, said logic unit, said current sensor, and said computer system are contained in a housing sized and shaped for installation in an electrical box.

11. The device of claim 10, wherein said housing comprises:
    a first power terminal transmitting power to said first power input line when power is transmitted to said first power terminal;
    a second power terminal transmitting power to said second power input line when power is transmitted to said second power terminal.

12. The device of claim 1, further comprising a dimming circuit operable to reduce the amount of power transmitted from the device.

13. The device of claim 12, wherein said dimming circuit is operable to reduce the amount of power transmitted form the device to zero.

14. The device of claim 1, wherein said logic unit and said computer system comprise a single component.

15. An electrical system comprising:
    at least one intelligent electrical switching device comprising:
       a mechanical switch, said mechanical switch being in an operational state;
       a logic unit operatively coupled to said mechanical switch such that said logic unit is operable to cause said mechanical switch to change said operational state;
       a computer system
       a current sensor;
       a computer system coupled to said logic unit and comprising a wireless transmitter/receiver operable to send and receive data over a telecommunications network, said computer system comprising a non-transitory machine-readable storage medium having stored thereon computer program instructions for causing the intelligent electrical switching device to perform the steps of:
          wirelessly receiving instructions to set a power state of a circuit in which said intelligent switching device is installed to a desired power state, said desired power state being indicated in said received instructions;
          detecting whether said circuit is in said desired powered state by said current sensor detecting whether current is present on a neutral wire of said circuit;
          only if said circuit is detected as not being in said desired powered state, said logic unit operating said mechanical switch to change said operational state;
    at least one mechanical switching device;
    wherein said at least one intelligent electrical switching device and said at least one mechanical switching device are in electrical communication with a single load in a multi-way switching geometry.

16. The system of claim 15, wherein said at least one intelligent electrical switching device further comprises:
    a first power input line;

a power converter disposed on said first power input line, said power converter converting alternating current to direct current;

a direct current line transmitting current from said power converter to said logic unit when said device receives power on said first power input line.

17. The system of claim 16, wherein said at least one intelligent electrical switching device further comprises:

a second power input line;

a second power converter disposed on said second power input line, said second power converter converting alternating current to direct current;

a second direct current line transmitting current from said second power converter to said logic unit when said device receives power on said second power input line.

18. The system of claim 17, wherein said at least one intelligent electrical switching device further comprises:

a voltage sensor disposed on said second power input line and sensing the amount of voltage on said second power input line;

said computer system further comprising computer program instructions for causing the intelligent electrical switching device to perform the steps of:

determining a probability that said device is installed in a switching position immediately prior to a load in said circuit based at least in part on voltage readings received from said voltage sensor.

19. The system of claim 15, wherein said at least one intelligent electrical switching device further comprises a dimming circuit operable to reduce the amount of power transmitted from said at least one intelligent electrical switching device.

* * * * *